C. W. KERSTETER.
SPRINKLER HEAD FOR AUTOMATIC FIRE EXTINGUISHERS.
APPLICATION FILED APR. 23, 1912.

1,044,459.

Patented Nov. 12, 1912.

Witnesses:
G. W. Domarus Jr.
R. Bauerle

Inventor:
Charles W. Kersteter
By [signature]
Attys

UNITED STATES PATENT OFFICE.

CHARLES W. KERSTETER, OF MILWAUKEE, WISCONSIN.

SPRINKLER-HEAD FOR AUTOMATIC FIRE-EXTINGUISHERS.

1,044,459.

Specification of Letters Patent. Patented Nov. 12, 1912.

Application filed April 23, 1912. Serial No. 692,725.

*To all whom it may concern:*

Be it known that I, CHARLES W. KERSTETER, a citizen of the United States, residing at Milwaukee, in the county of Milwaukee and the State of Wisconsin, have invented certain new and useful Improvements in Sprinkler-Heads for Automatic Fire-Extinguishers, of which the following is a specification.

The present invention relates to that class of sprinkler heads in which the cap or valve is held normally seated by a strut operating after the manner of a toggle, said strut being made up of a number of parts normally held together by solder fusible at a pre-determined temperature.

The invention relates more particularly to the construction of the strut and its object is to provide a strut of improved construction.

Figure 1:
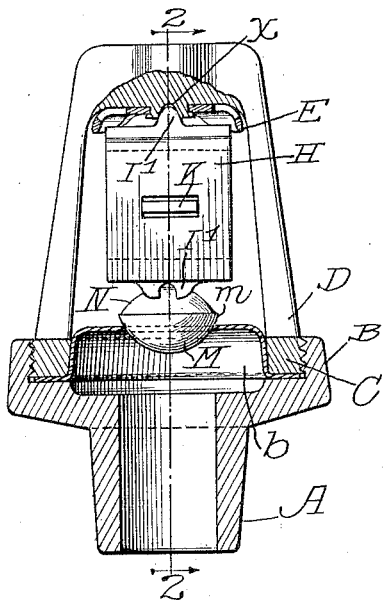
Figure 2:
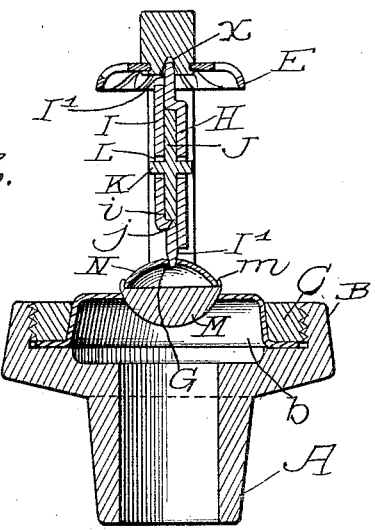

To this end the invention consists in the features of novelty that are hereinafter described with reference to the accompanying drawing which is made a part of this specification and in which:

Figure 1 is a side elevation of a sprinkler head embodying the invention. Fig. 2 is an axial section thereof, on an enlarged scale, on the line 2—2, Fig. 1.

A represents the base of the sprinkler head which is adapted to be secured to one of the discharge ends of the distributing pipe. It has an annular flange, B, preferably screw-threaded on its interior for the reception of corresponding threads on a ring, C, which forms the base of the yoke, D, which yoke supports at its upper end a deflector or distributer, E, all of which parts may be of customary or of any desired construction.

In the counter-sink or chamber, b, of the base, A, resulting from the flange, B, is a diaphragm, F, made of elastic sheet metal and provided with an opening opposite the opening, a, of the base, A, for the outlet of the water when the cap or valve, G, is displaced. This cap or valve is held normally seated on the diaphragm, F, by a strut, H. This strut, according to the present invention, is made up of two plates or posts having parallel portions, I, and off-set ends, I', resulting in shoulders, i, which are presented upwardly and downwardly, respectively. Interposed between the parallel portions, I, of the two plates is a third plate, J, the ends of which are chamfered so as to provide knife-edge bearing surfaces, j, which contact with the shoulders, i and i, respectively, on opposite sides of the line of thrust, this line of thrust being, when the parts are assembled as shown in the drawing, a straight line extending from the point x, at which one end of the strut bears against the yoke, to the point y, at which the opposite end of the strut bears against the cap or valve.

The parallel portions, I, of the plates or posts are provided with openings through which pass lugs or arms, K, projecting laterally from the opposite faces of the plate, H, and the slight spaces between these lugs and the walls of the openings are filled with a mass of solder, L, which acts as a rivet for preventing the parallel portions, I, of the plates from moving asunder. In addition to this mass of solder, all of the meeting faces of the several parts of the strut are secured together by solder fusible at a pre-determined temperature, in the usual manner. The cap or valve, G, is preferably made of a solid body portion, M, of hard material the top of which is counter-sunk, resulting in short flanges, m, and an inverted concavo-convex disk, N, made of elastic sheet metal, the margins of which rest upon the body-portion, M, within the counter-sink and are there secured by spinning the flange, m, inward as shown in Fig. 2. The lower end of the strut preferably has two short tongues or projections, n, which occupy corresponding perforations through the disk, N, the object of this being to provide a non-rotative engagement between the strut and the cap or valve.

The method of assembling the parts and their mode of operation need not be here described as they will be fully understood by those skilled in the art.

What I claim as new and desire to secure by Letters Patent is:

1. A strut for sprinkler heads for automatic fire extinguishers having in combination two plates or posts having parallel portions and off-set ends providing shoulders presented upwardly and downwardly, respectively, the parallel portions of said plates or posts having openings through them, a third plate or post arranged between the parallel portions of the plates or posts aforesaid and bearing upon said shoulders upon opposite sides of the line of thrust, said third plate or post having lugs or arms projecting laterally from its opposite faces and loosely occupying the openings of the plates aforesaid and solder uniting the opposing faces of the several parts, respectively.

2. A strut for sprinkler heads for automatic fire extinguishers having in combination two plates or posts having parallel portions and off-set ends providing shoulders presented upwardly and downwardly, respectively, the parallel portions of said plates or posts having openings through them, a third plate or post arranged between the parallel portions of the plates or posts aforesaid, the ends of said third plate or post being chamfered to provide knife edges bearing upon said shoulders upon opposite sides of the line of thrust, said third plate or post having lugs or arms projecting laterally from its opposite faces and loosely occupying the openings of the plates aforesaid and solder uniting the opposing faces of the several parts.

3. A strut for sprinkler heads for automatic fire extinguishers having in combination two plates or posts having parallel portions and off-set ends providing shoulders presented upwardly and downwardly, respectively, the parallel portions of said plates or posts having openings through them, a third plate or post arranged between the parallel portions of the plates or posts aforesaid, the ends of said third plate or post being chamfered to provide knife edges bearing upon said shoulders upon opposite sides of the line of thrust, said third plate or post having lugs or arms projecting laterally from its opposite faces and loosely occupying the openings of the plates aforesaid and solder uniting the opposing faces of the several parts, the meeting surfaces of the several parts being secured together by solder and the openings aforesaid being filled by a mass of solder.

CHARLES W. KERSTETER.

Witnesses:
 L. M. HOPKINS,
 G. L. ROBINSON.

---

Copies of this patent may be obtained for five cents each, by addressing the "Commissioner of Patents, Washington, D. C."